United States Patent [19]

Sartorio

[11] Patent Number: 5,584,199

[45] Date of Patent: Dec. 17, 1996

[54] DEVICE FOR MEASURING AN ANGLE IN A WORKPIECE

[75] Inventor: Franco Sartorio, Turin, Italy

[73] Assignee: Amada Company, Limited, Kanagawa, Japan

[21] Appl. No.: 325,330

[22] PCT Filed: Feb. 21, 1994

[86] PCT No.: PCT/JP94/00257

§ 371 Date: Dec. 13, 1994

§ 102(e) Date: Dec. 13, 1994

[87] PCT Pub. No.: WO94/19662

PCT Pub. Date: Sep. 1, 1994

[30] Foreign Application Priority Data

Feb. 23, 1993 [IT] Italy ................... TO93A0117

[51] Int. Cl.⁶ ........................................ B21D 5/02
[52] U.S. Cl. .......................... 72/18.6; 72/18.1; 72/19.6; 72/389.3; 72/702
[58] Field of Search ................... 72/10, 12, 34, 72/389, 702, 16.2, 16.3, 16.8, 18.2, 18.1, 18.6, 19.6, 389.3, 389.5

[56] References Cited

U.S. PATENT DOCUMENTS 3,440,847  4/1969  Giordano .
4,131,008  12/1978 Malatto .
4,864,509  9/1989  Somerville et al. ............... 72/389
5,007,264  4/1991  Haack ........................... 72/702
5,148,693  9/1992  Sartorio et al. .
5,375,340  12/1994 Gerristen ......................... 72/34

FOREIGN PATENT DOCUMENTS

0352097  1/1990   European Pat. Off. .
596751   5/1994   European Pat. Off. ............ 72/34
2362722  3/1978   France ........................... 72/389
2379046  8/1978   France .
2654369  5/1991   France .
2044199  3/1972   Germany ......................... 72/389
82119    5/1984   Japan ............................ 72/34
2072551  10/1981  United Kingdom .

Primary Examiner—David Jones
Attorney, Agent, or Firm—Wigman, Cohen, Leitner & Myers, P.C.

[57] ABSTRACT

A device for measuring an angle in a workpiece piece which includes a base; a pair of feelers which are movable relative to the base and each of which has an active surface for contacting a respective portion of the workpiece piece during the measurement; a thrust mechanism for bringing the active surfaces of said feelers into contact with the respective portions of the workpiece piece being measured; and a sensor mechanism for detecting the positions of the feelers relative to the base.

14 Claims, 10 Drawing Sheets

DEVICE FOR MEASURING AN ANGLE IN A WORKPIECE

TECHNICAL FIELD

The present invention relates to a device for measuring an angle in a workpiece, particularly an angle formed in a piece of sheet metal by bending, during the operation to bend the workpiece in a bending press having a punch and a V-shaped die which cooperate with each other.

BACKGROUND ART

Devices for measuring an angle formed in a workpiece by bending directly during the bending operation in a bending press have already been proposed.

Figure 1:
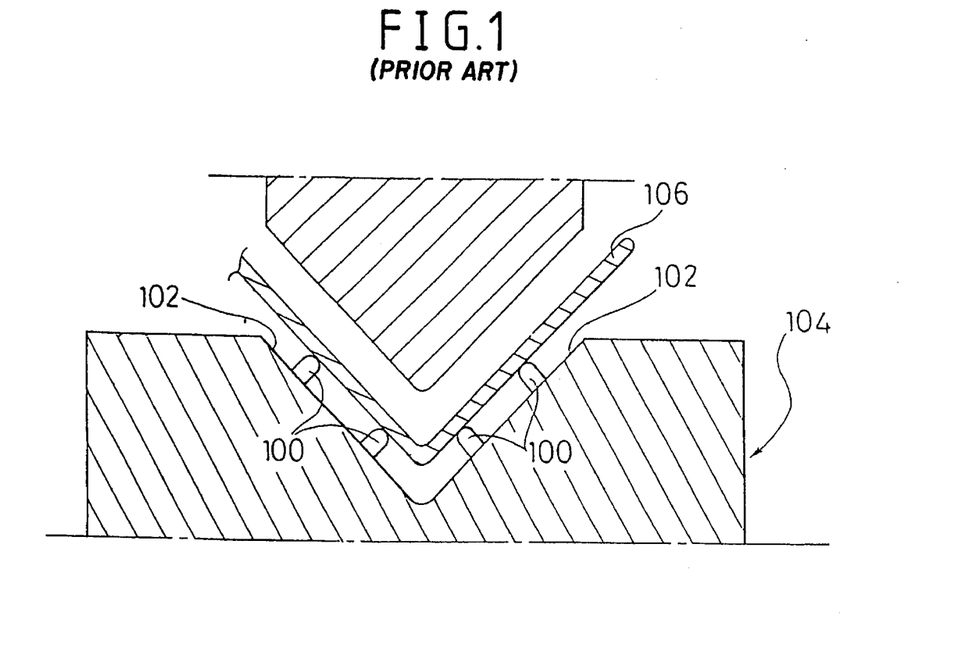
FIG. 1 is a schematic view of a prior measuring device.

One of these known devices, which is shown in FIG. 1, provides for the use of two or more distance-measuring sensors 100 disposed on each face 102 of the V-shaped groove in the die 104. This known device calculates the angle formed in the workpiece by bending, by means of direct distance measurements between the surface of the piece and the respective wall 102 of the V-shaped groove in the die 104, made with pointed feelers 100 at two points spaced a known distance apart in a direction perpendicular to the bending line. The main disadvantage found with this solution results from the need to miniaturize the device if it is to be used in "real time", that is, immediately after the bend has been made with the sheet metal still in the die, just after the punch has been raised to leave the sheet metal free. In fact, in order to obtain an accurate measurement of the bend angle, it is necessary to measure the distance between the workpiece and the wall of the V-shaped groove with an accuracy of the order of one micron, particularly when the V-shaped groove itself is small. Although the sensors can make measurements with this accuracy, the measurement effected is corrupted decisively by the surface roughness of the piece which is of the same order of magnitude as the precision with which the measurement has to be made.

DISCLOSURE OF THE INVENTION

The object of the present invention is to provide a device for measuring an angle in a workpiece, which is not affected by the aforementioned disadvantages and which provides very precise and reproducible measurements regardless of the condition of the surface of the workpiece.

This device includes a base (8, 60); and a pair of feelers (12, 72) which are movable relative to the base (8, 60) and each of which has an active surface (16, 73) for contacting a respective portion (2a, 2b) of the workpiece (2) during the measurement. The feelers (12, 72) are completely free of each other kinematically. The device includes thrust mechanism (18, 82) for bringing the active surfaces (16, 73) of the feelers (12, 72) into contact with the respective portions (2a, 2b) of the workpiece (2) being measured. The thrust mechanism (18, 82) associated with one feeler (12, 72) are completely independent of the thrust mechanism (18, 82) associated with the other feeler (12, 72) and allow the respective feeler (12, 72) to perform a translatory movement relative to the base (8, 60) completely independently of the movement of the the other feeler (12, 72). The device further comprises sensors mechanism (32, 84) for detecting the positions of the feelers (12, 72) relative to the base (8, 60).

Figure 2:
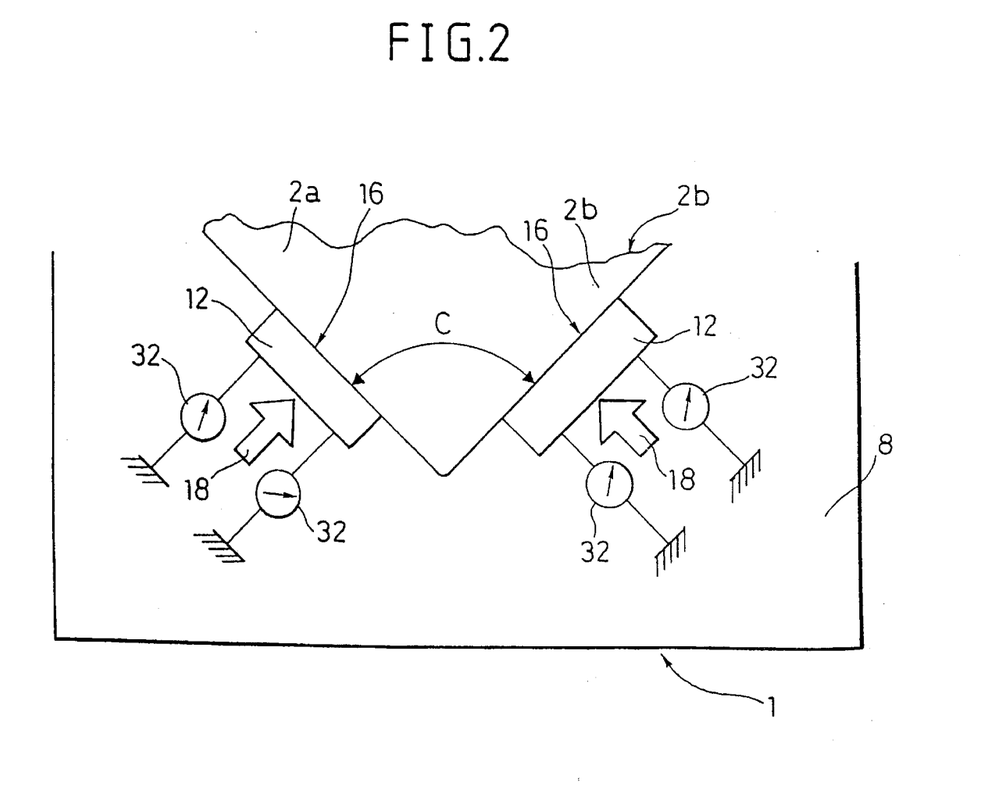
FIG. 2 is a diagram showing the concept of the device according to the invention.
Figure 3:
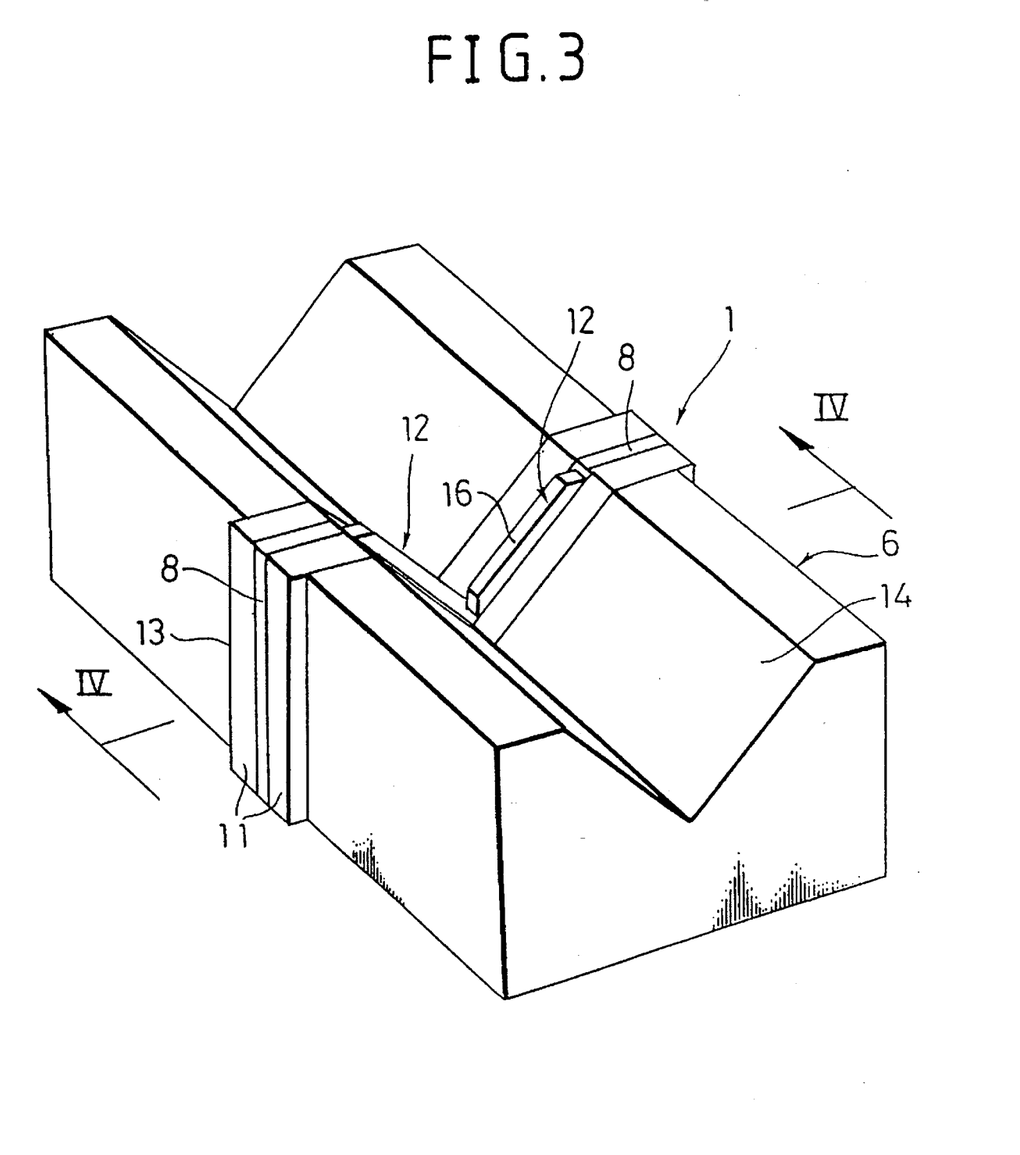
FIG. 3 is a schematic, perspective view of a device according to the invention mounted on the die of a bending press.

According to the invention, this object is achieved by the provision of a device having the characteristics forming the subject of claim 1, a conceptual diagram of which is shown in FIG. 2.

BRIEF DESCRIPTION OF THE DRAWINGS

Further characteristics and advantages of the present invention will become clear in the course of the detailed description which follows, given purely by way of non-limiting example, with reference to the appended drawings, in which:

FIG. 5 is a section taken on the line V—V of FIG. 4, FIGS. 6, 7 and 8 show the operation of the device according to the invention during the formation of a bend in a piece of sheet metal, FIG. 10 is a section taken on the line X—X of FIG. 9, FIGS. 11, 12 and 13 show the operation of the device of FIGS. 9 and 10 during the formation of a bend in a piece of sheet metal.

BEST MODE FOR CARRYING OUT THE INVENTION

With reference to FIGS. 2 to 5, a device, indicated 1, is for measuring an angle formed in a piece of sheet metal 2 by bending, during a bending operation carried out on the workpiece by means of a bending press comprising a punch 4 and a die 6. The device 1 comprises a base 8 constituted by a steel plate a few millimeters thick with holes 10 for enabling it to be fixed between two bodies 11 so as to form a compact block which is inserted in a slot 13 in the die 6.

Figure 4:
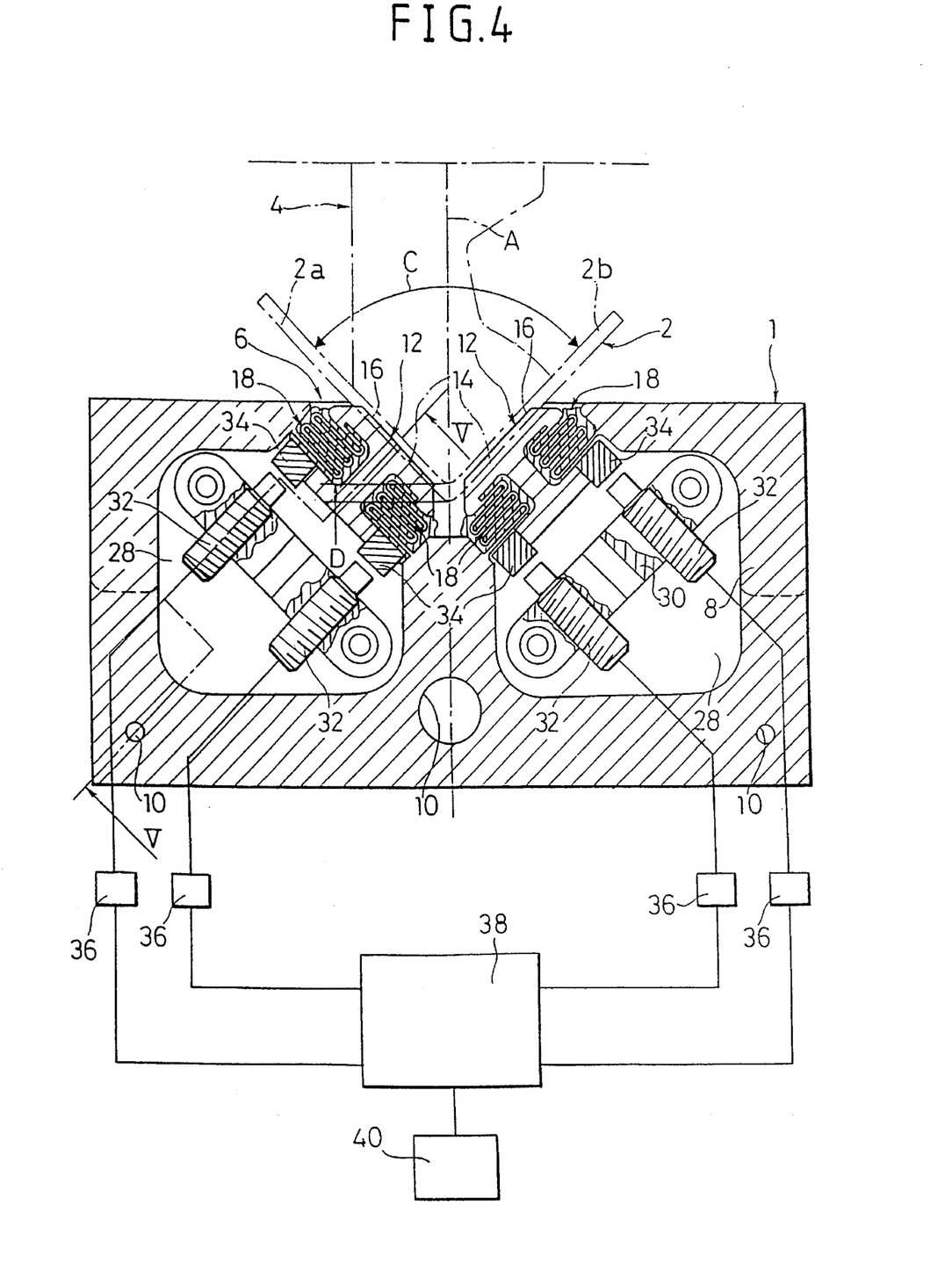
FIG. 4 is a section taken on the line IV—IV of FIG. 3.

With particular reference to FIG. 4, the device 1 has two feelers 12 disposed approximately symmetrically with respect to an axis A which passes through the vertex of the V-shaped groove 14 in the die 6. Each feeler 12 has an active surface 16 which extends beyond the respective wall of the groove 14. The active surfaces 16 of the feelers 12 are thus intended to contact respective portions 2a, 2b of the workpiece being bent.

Figure 4A:
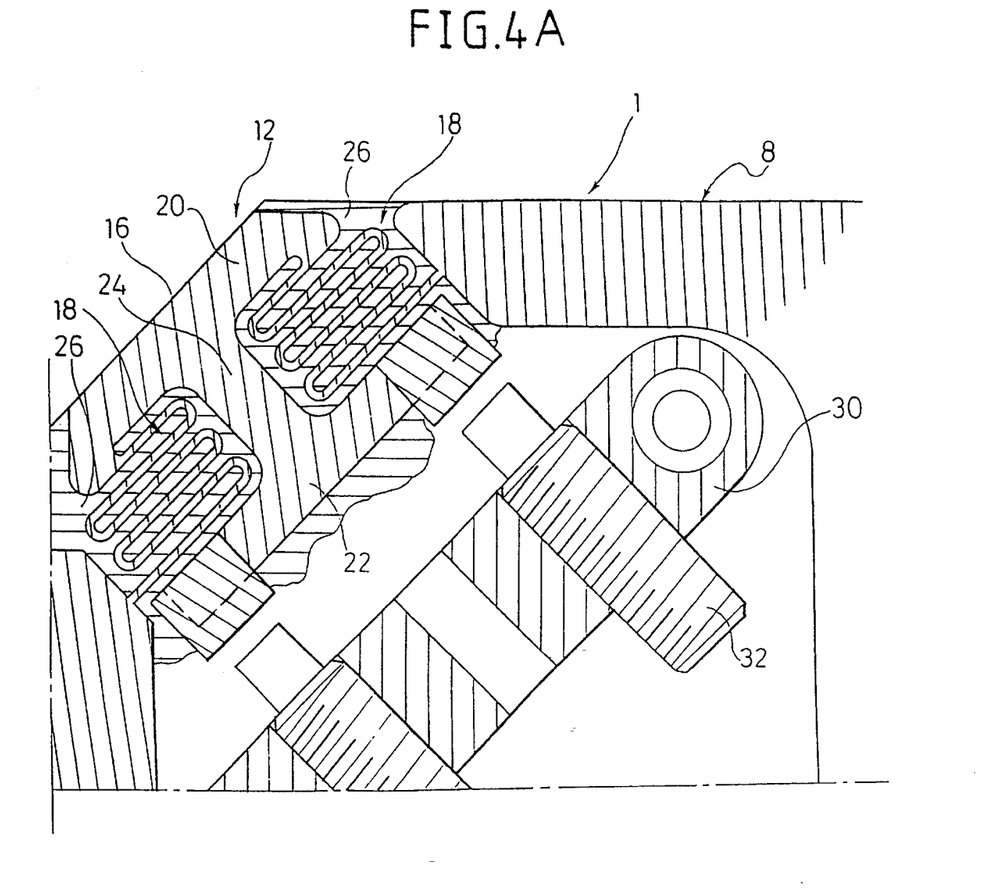
FIG. 4A shows a portion of FIG. 4 in greater detail.

As can be seen in greater detail in FIG. 4a, each feeler 12 is connected to the base 8 by means of two connecting elements 18 formed integrally with the base 8 and with the feeler 12. In the embodiment illustrated in the drawings, the connecting elements 18 are constituted by thin, multiple-S-shaped strips of material.

The particular system for connecting the feelers 12 to the base 8 means that the feelers 12 are completely free of each other kinematically. The connecting elements 18 also constitute resilient thrust means which allow each feeler 12 to perform a translatory and a pivoting movement relative to the base 8, within a plane perpendicular to the bending line, completely independently of the movement of the other feeler.

Each feeler 12 is H-shaped with two portions 20, 22 joined together by a central web 24. The connecting and thrust elements 18 are very flexible in a direction perpendicular to the active surfaces 16 of the respective feelers 12.

As already stated, in the embodiment shown in the drawings, the feelers 12 and the connecting and thrust elements 18 are formed integrally from a steel plate constituting the base 8. More precisely, each feeler 12 and its connecting and thrust elements 18 are produced by the removal of material from the region 26 which is shaded in FIG. 4a. In order to ensure that the connecting elements 18 behave resiliently, the base 8 is made of a hardened steel with a high yield point, of the type used for the manufacture of springs.

Figure 5:
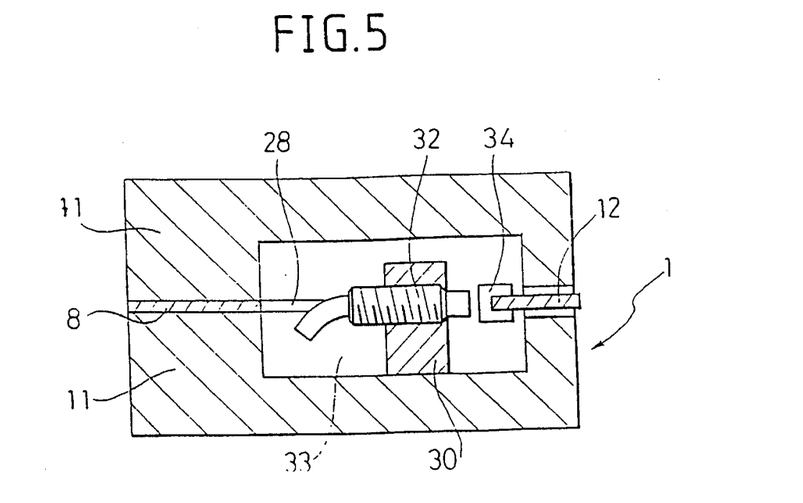

With reference to FIGS. 4 and 5, the material has also been removed from the base 8 in correspondence with two seats 28 with generally quadrangular outlines in which respective supports 80 fixed to the bodies 11 are disposed. Each support 30 carries a pair of distance-measuring sensors 32 formed according to the prior art, which are housed—parallel to each other—and lying in a plane perpendicular to the vertex of the V-shaped groove 14, in a chamber 33 defined between the two bodies 11. Each sensor 32 faces a respective corresponding element 34 fixed to the feeler 12. The sensors 32 are high-sensitivity contactless electromagnetic probes which generate magnetic fields, the intensities of which depend upon the distances between the corresponding elements 34 and the end surfaces of the sensors 32. The surfaces of the corresponding elements 34 which face the sensors 32 are approximately parallel to the active surfaces 16 of the feelers 12. Each sensor 32 is connected to an amplifier 36 which sends a signal indicative of the distance measured to a control unit 38. The control unit 38 operates a numerically-controlled actuator 40 which brings about the relative movement of the bending tools 4, 6.

The operation of the device according to the invention will be described below with reference to FIGS. 6 to 8.

Before the bending operations start, it is necessary to calibrate the measuring device described above. For this purpose, a sample punch with a vertex angle $V_0$ which is known with an accuracy equal to or better than that with which the subsequent measurements are to be made is mounted on the press instead of the bending punch. When the sample element enters the V-shaped groove 14 in the die, the active surfaces 16 of the feelers 12 which are acted on by the connecting and thrust elements 18 adapt precisely to the surfaces of the sample element. At this point, the distance measurements supplied by the four sensors 32 are stored by the control unit 38 and adopted as reference values for the subsequent measurements.

Figure 6:
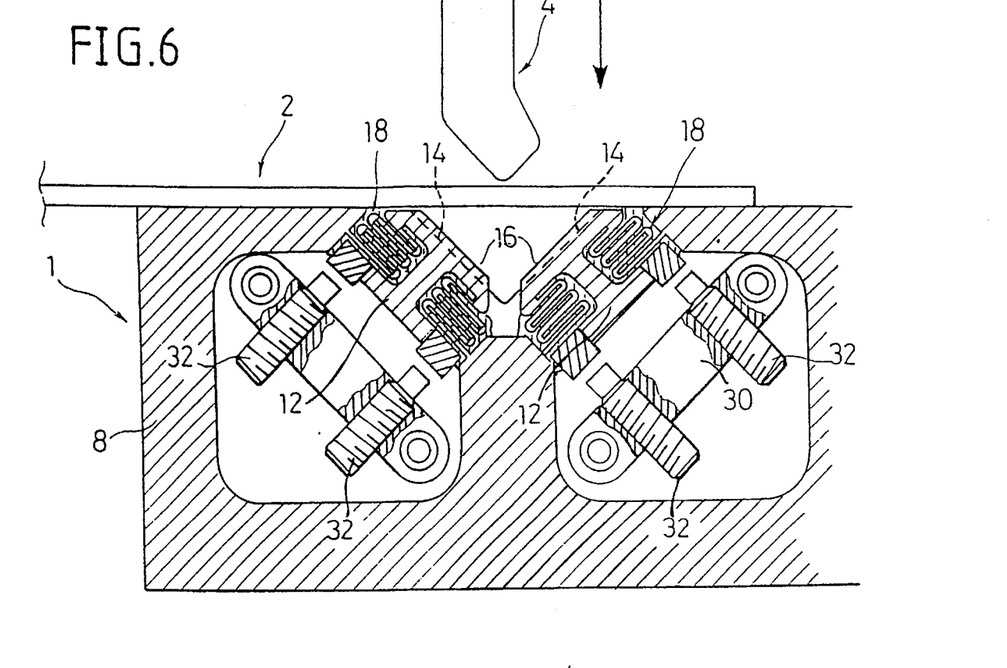
Figure 7:
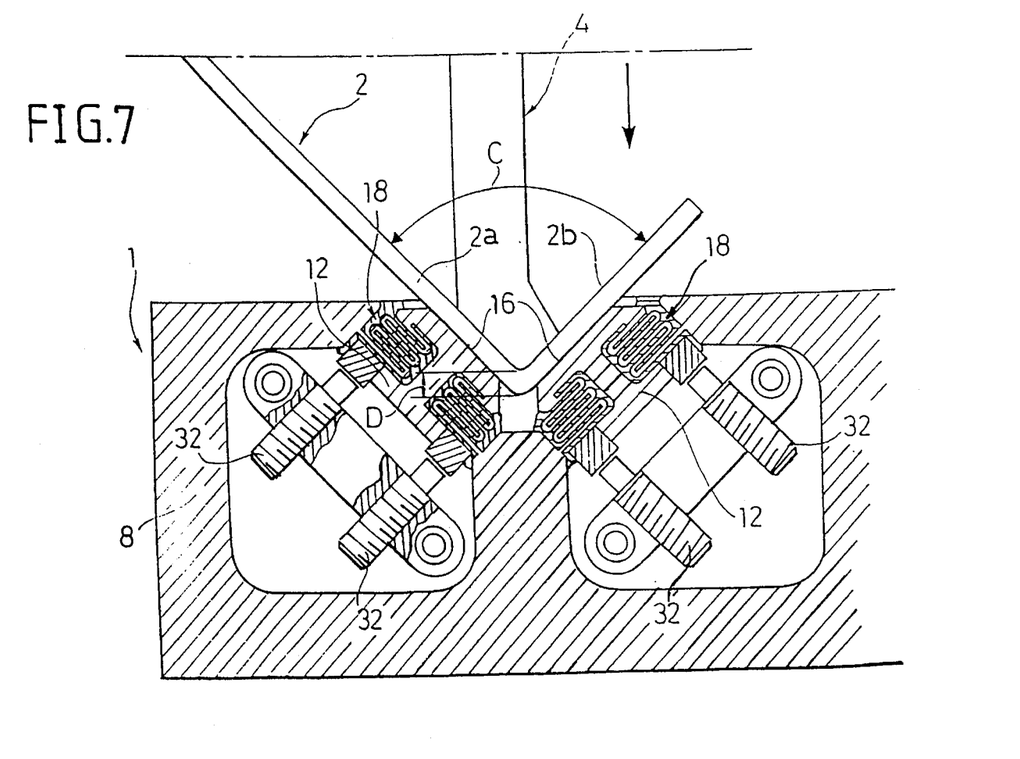

After the calibration has been carried out and the sample element has been replaced by the bending punch 4, a flat piece of sheet metal 2 is placed on the die 6 in a position perpendicular to the bending plane defined by the direction of the relative movement of the punch 4 and the die 6 (FIG. 6). The punch 4, which is operated by the actuator 40, controlled by the control unit 38, then enters the groove 14 in the die 6 forming a bend in the workpiece 2 (FIG. 7). The feelers 12 are retracted relative to the walls of the groove 14 against the resilient action of the connecting and thrust elements 18.

Initially, the relative bending travel of the tools 4, 6 corresponds to a bending angle C slightly smaller than the desired value.

Figure 8:
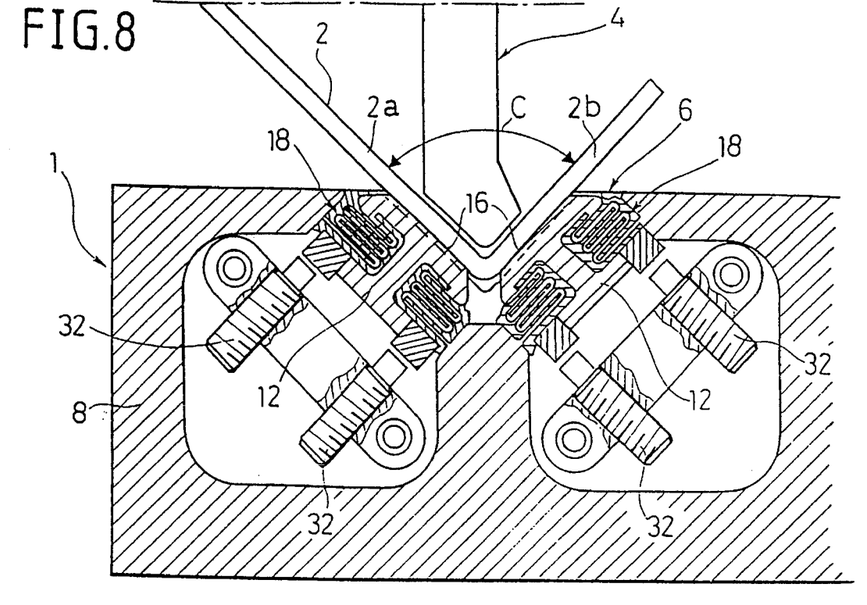

After this preliminary bending has been carried out, the tools 4, 6 are moved apart far enough to leave the sheet metal free so that the two portions 2a, 2b of the piece being worked can return resiliently (FIG. 8). After the bending tools 4, 6 have been moved apart, the sheet metal 2 is in a generic position relative to the groove 14 and the vertex of the sheet-metal dihedron remains sufficiently parallel to the vertex of the V-shaped groove 14. The active surface 16 of the feelers 12 are kept in contact with the respective portions 2a, 2b of the piece 2 by the resilient force exerted by the connecting and thrust elements 18. The feelers 12 can adapt precisely to the position adopted by the workpiece 2, since each feelers is free to move within the plane, independently of the other. The feelers 12 thus adopt angular orientations the same as those of the portions 2a, 2b of the workpiece 2. These angular orientations are also independent of the distances of the feelers 12 from the vertex of the bent sheet-metal dihedron. These distances may even be different for the two feelers 12. The contact between the feelers 12 and the workpiece 2 takes place over a large surface 16 and therefore the determination of the bending angle is not affected by the surface roughness of the workpiece.

The distance-measuring sensors 32 associated with each feeler 12 are spaced a known distance apart so that the control unit 38 can determine the actual angle C formed in the bent workpiece by comparing the distance measurements provided by the four sensors 32 with those obtained during the calibration. The control unit 38 checks the bend angle, measured against the desired bend angle, and operates the actuator 40 again so as to make the distance D between the vertices of the tools 4, 6 slightly less than the distance set during the preliminary bending. The method described is repeated until the distance D determined corresponds to the desired bend angle C. This value is then stored and is used for all the subsequent bending operations on pieces having the same physical characteristics. During the subsequent bending operations, the device 1 enables the bend angle of the piece to be measured continuously and corrections to be made, should the need arise.

FIGS. 9 to 13 show a variant of the device according to the invention. Elements corresponding to those described above are indicated by the same reference numerals.

Figure 9:
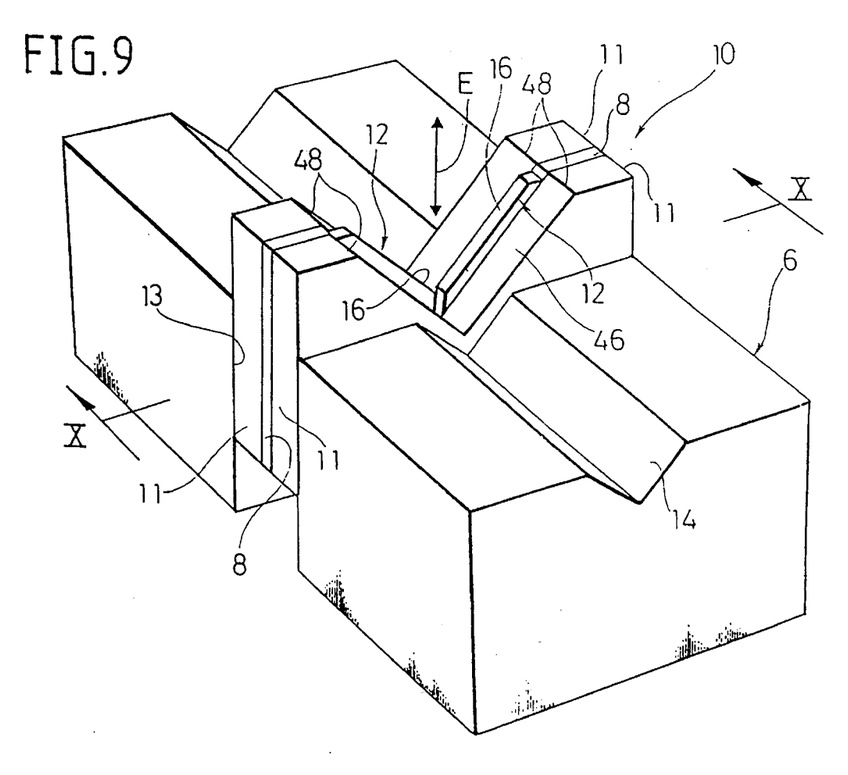
FIG. 9 is a perspective view similar to FIG. 3 showing the second embodiment of the device according to the invention.
Figure 10:
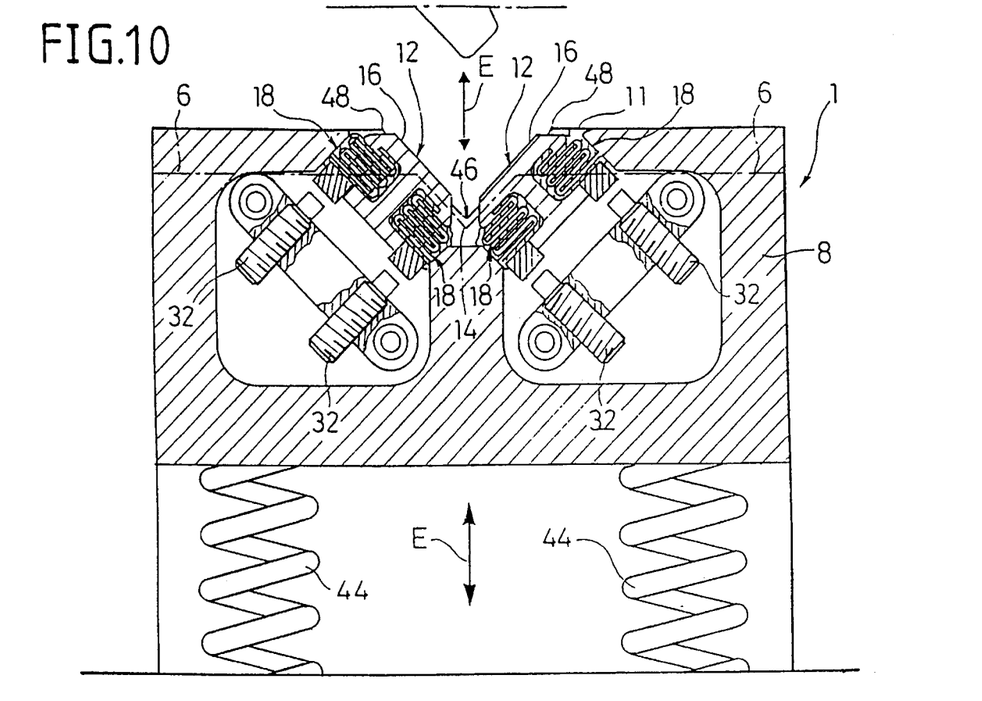

Instead of being fixed to the die 6, the device 1 according to the variant of FIGS. 9 to 13 is slidable in the slot 13 in the die 6 in the directions indicated by the double arrow E. A pair of compression springs 44 urges the device 1 towards a raised rest position shown in FIGS. 9 and 10. The force of these springs is much greater than that generated by the connecting and thrust elements 18 of the feelers 12. As can be seen in FIG. 9 in particular, the two bodies 1 between which the base 8 is clamped form a V-shaped groove 46, the sides of which are substantially larger than the sides of the V-shaped groove 14 in the die 6 and which—in the rest position—project relative to the corresponding walls of the V-shaped groove 14 in the die 6, which is indicated in chain line in FIG. 10. The bodies 11 have a pair of edges 48 at the upper ends of the V-shaped groove 46; these edges 48 constitute reference surfaces for abutting the portions 2a, 2b of the bent piece in order to define a predetermined relative position between the device 1 and the piece of sheet metal 2 during the measurement of the bend angle.

Figure 11:
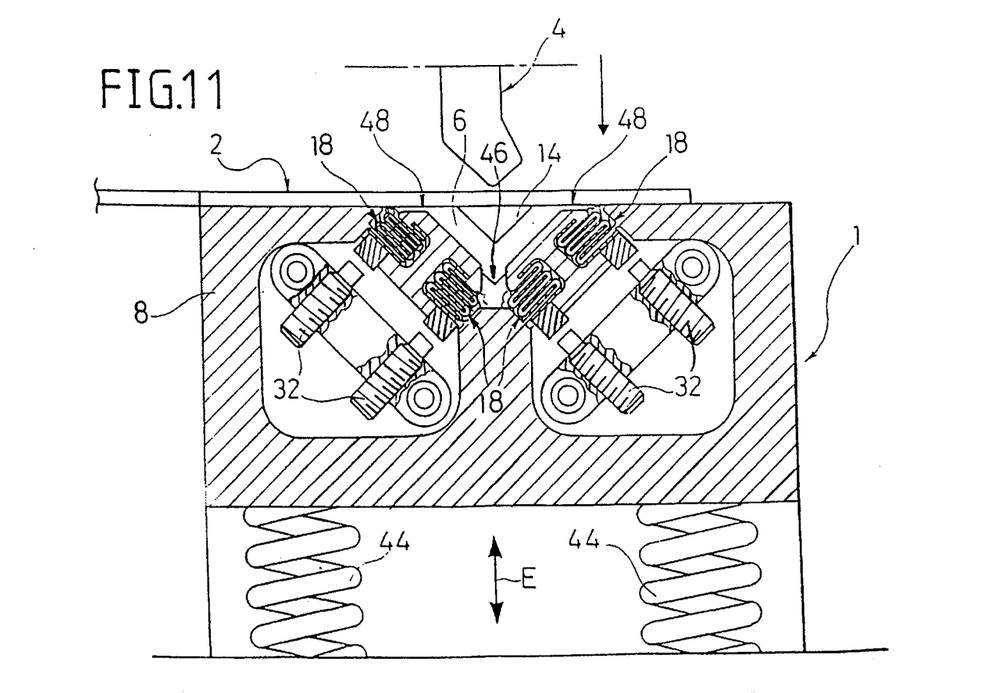
Figure 12:
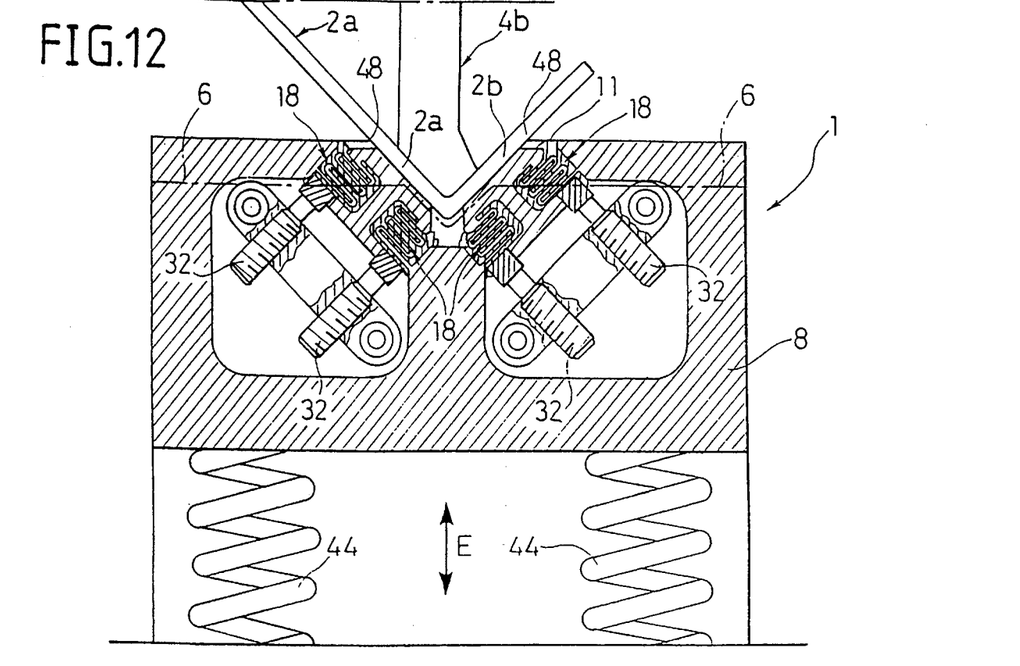

With reference to FIG. 11, when a piece of sheet metal 2 is placed on the die 6, the springs 44 are compressed until the upper surface of the device 1 is brought to the same level as the upper surface of the die 6. Upon completion of the bending (FIG. 12), the springs 44 urge the device 1 upwardly until the edges 48 of the bodies 11 contact the workpiece 2, defining a stable relative position between the device 1 and the piece. The contact between the edges and the workpiece 2 is maintained even when the punch 4 moves away from the die 6 to enable the material to return resiliently so that the actual bend angle can be measured (FIG. 13).

Figure 13:
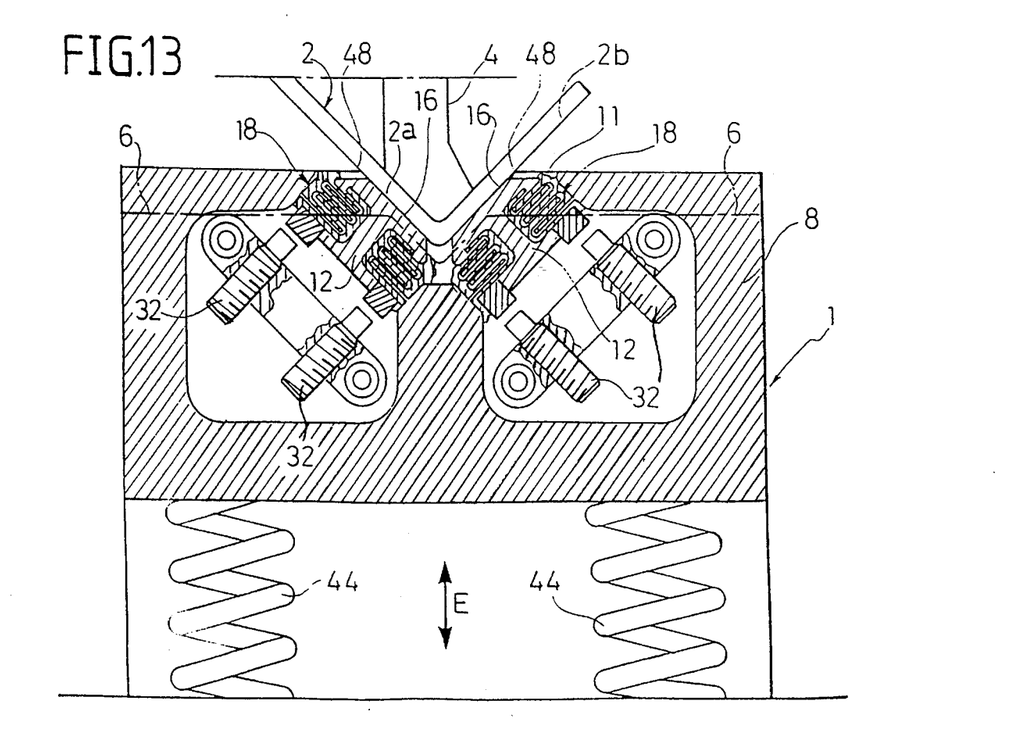

As can be seen from FIG. 13, the angle of the bend formed in the sheet metal 2 is generally larger than the angle of the V-shaped grooves 46 in the bodies 11. The relative positions of the movable measuring device 1 and the sheet metal 2 is therefore determined by the edges 48. Thus, these are the only elements of the V-shaped groove 46 which can ensure that the position adopted by the feelers 12 at the time of the measurement are within their useful travel.

After the measurement, the cycle continues as in the case of the former device.

One of the important advantages of this variant is that, when the V-shaped groove 14 in the die is very small, the lengths of the surfaces 16 of the feelers 12 may be substantially greater, since the V-shaped grooves 46 in the bodies 11 may be larger than the V-shaped groove 14 in the die. The V-shaped groove 46 must, however, be smaller than the smaller of the two portions 2a and 2b of the sheet metal against which it bears. Since the size of the V-shaped groove 46 in the measuring device 1 is not restricted by the size of the V-shaped groove 14 in the die 6, clearly the measuring device can be used for a plurality of tools with V-shaped grooves 14 of different sizes.

This advantage is also extremely important from practical and economic points of view.

The modes of operation of the device described above provide for the bending movement of the bending press to be brought about by a numerically-controlled actuator 40. However, the same device can, of course, be used on a manually-operated bending press. In this case, the control unit 38 is limited to presenting the data relating to the angle measured, for example, on a display.

Figure 14:
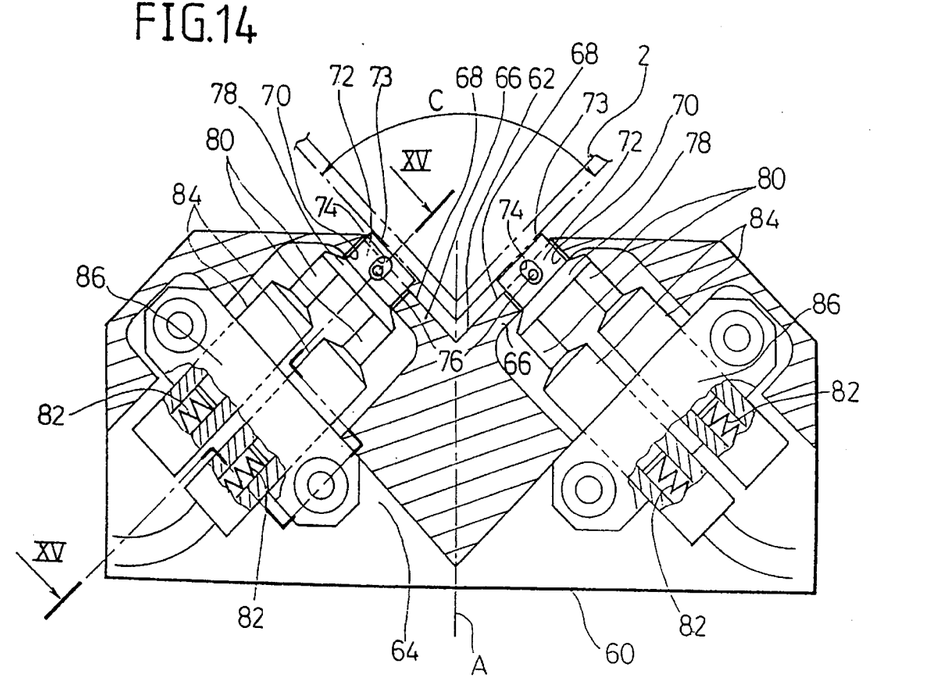
FIG. 14 is a sectional view of the third embodiment of the device according to the invention.
Figure 15:
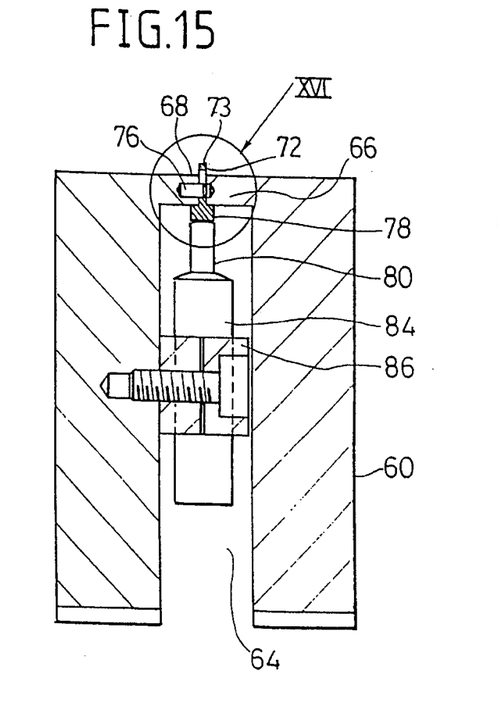
FIG. 15 is a section taken on the line XV—XV of FIG. 14.
Figure 16:
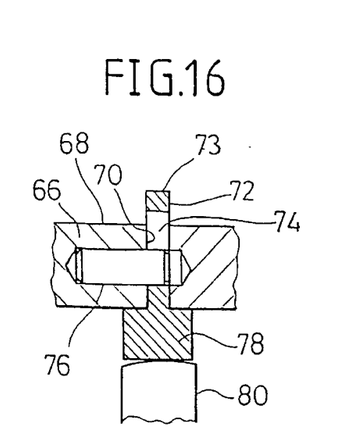
FIG. 16 shows a portion indicated by XVI of FIG. 15 in greater detail.

FIGS. 14, 15 and 16 show an another variant of the device according to the invention. Elements corresponding to those described above are indicated by the same reference numerals.

This device includes a base 60. The base 60 is formed approximately in a shape of rectangular block and has a V-shaped groove 62 defined by two groove surface 68 on the top portion of the base 60; the V-shaped groove 62 receives the folded workpiece 2. The base 60 has a gap 64 which opens mainly toward the bottom surface thereof. The base 60 further has a pair of portion 66 at a suitable position of the top portion thereof.

Each portion 66 is provided with a hole 70 that communicate from the gap 64 to the groove 62. A pair of feelers 72 are provided in the holes 70 respectively. The each feeler 72 is movably disposed within a plane perpendicular to the vertex of the V-shaped groove 62. The each feeler 72 is formed in a shape of a rectangular plate and has a active surface 78 so as to be in contact with the piece 2. The each feeler has a longitudinal slot 74. A pin 76 is inserted in the longitudinal slot 74, and the both ends of the pin 76 are fixed to the inside wall of the hole 70. In addition the feeler 72 has a bottom portion 78. In this configuration, the feeler 72 is movable in the direction perpendicular to the groove surface 68 and rotatable about the pin 76.

A pair of distance measuring sensors 84 for each feeler 72 are fixed to the base 60 by the bracket 86. A rod 80 is inserted in each distance-measuring sensor 84. The each rod 80 is pushed against right and left end of the bottom portion 78 of the feeler 72 by a spring 82. Each rod 80 is extended in the direction which is perpendicular to the groove surface 68 and is within the plane perpendicular to the vertex of the V-shaped groove 62. The distance-measuring sensors 84 can measure the position of the rod 80 with respect to the distance-measuring sensors 84. In this configuration, when the workpiece 2 folded by the punch 4 and die 6 comes into contact with the each feeler 72, the pair of rods 80 are retracted into the sensors 84 respectively. Each position of the rod is then measured by the sensor 84 and the bend angle C is calculated by the control unit.

In this variant device, the pair of feelers 72 are movable and rotatable independently within the plane perpendicular to the vertex of the V-shaped groove 62, and therefore the active surface 73 of the feelers 72 can adapt precisely to the surface of the workpiece 2. Accordingly this device can measure the bend angle C precisely. Further, this device has the feelers 72 each of which has large active surface 73. Therefore the determination of the bending angle C is not affected by surface roughness of the piece 2. Moreover the feelers 72 are provided on the base 60 rather than on the die. Therefore, the bend angle C can be precisely measured by means of the active surfaces 73, even if the V-shaped groove 14 of the die 6 is very small; this is because the lateral width of the active surface 73 could be longer than the width of the V-shaped groove 14 of the die 6. Consequently this device can measure the bent angle C precisely.

Figure 17A:
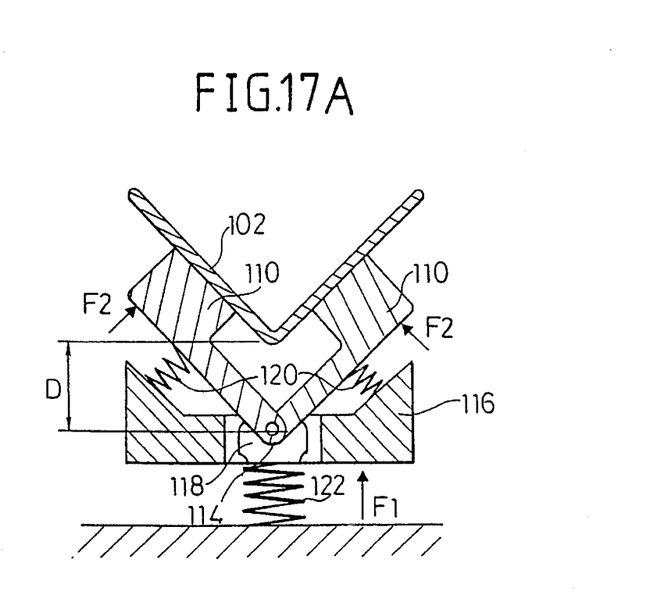
FIGS. 17A, 17B, and 17C are schematic views of another embodiment.
Figure 17B:
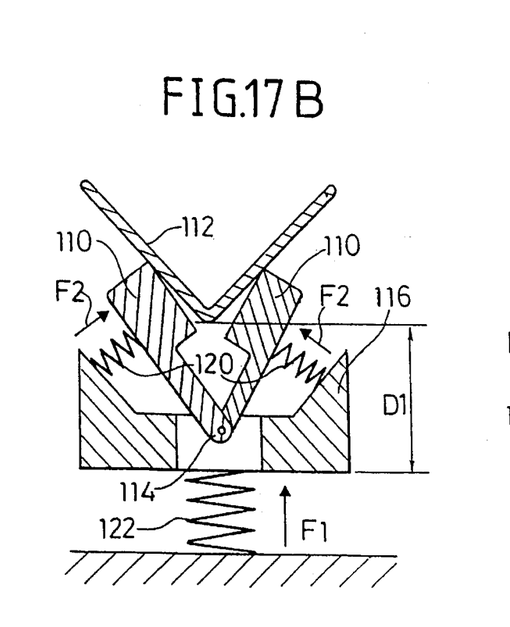
Figure 17C:
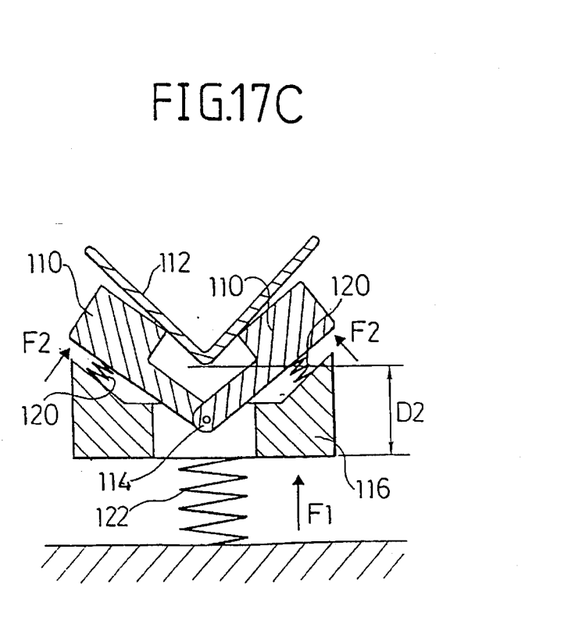

Another enbodymennt of this invention shown in FIGS. 17A, 17B and 17C provides for the use of two feelers 110 having large contact surfaces which are urged resiliently against respective portions of the bent-metal dihedron 112. The feelers 110 are articulated about the same shaft 114 which is carried by a base 116 movable perpendicular to the bending line. Means 118 are associated with the two feelers for measuring the angle formed between them. The feelers are associated with respective springs 120 which impart to the feelers 110 forces which make them pivot about their common articulation axis 114 in order to close them against the facing surfaces of the sheet-metal dihedron 112. The base 116 on which the feelers 110 are articulated is associated with an actuator 122 which urges the base 116 towards the vertex of the piece in a direction perpendicular to the bending line.

I claim:

1. A device for measuring an angle in a workpiece comprising:

a base provided with a V-shaped groove;

a pair of feelers positioned on the base symmetrically with respect to an axis passing through a vertex of said V-shaped groove so as to be movable relative to said base, said feelers having respective active surfaces arranged so as to form a V-shaped groove;

thrust means arranged in said base corresponding to said feelers for thrusting said feelers in respective directions perpendicular to said active surfaces so as to project from said base; and detecting means arranged in said base corresponding to said feelers for detecting a position of said feelers with respect to said base.

2. The device according to claim 1, wherein said thrust means comprise resilient members which connect said feelers to said base.

3. The device according to claim 2, wherein each of said feelers has an H-shaped configuration comprising a central web and two parallel portions, one of said parallel portions having each of said active surfaces and wherein said resilient members are in a form of two strips.

4. The device according to claim 3, wherein each of said strips is formed to have a labyrinth-shaped configuration.

5. The device according to claim 4, wherein said feelers and said resilient members are formed by removing material from a region complementary to a solid area defining said feelers and said resilient members.

6. The device according to claim 4, wherein said detecting means comprises, for each of said feelers, a pair of distance-measuring sensors which are arranged apart from each other at a predetermined distance and which are arranged so as to face two different points defined on the other one of said parallel portions.

7. The device according to claim 2, further comprising urging means arranged under said base for urging said base toward the workpiece, wherein said base is arranged so as to be movable with respect to the workpiece while said base is provided with defining means for defining a stable position of said workpiece in measuring the angle in the workpiece.

8. The device according to claim 7, wherein said urging means comprises at least one spring which urges against the workpiece with a force substantially greater than the force with which the resilient members keep said feelers in contact with the workpiece.

9. The device according to claim 8, wherein said defining means comprises a pair of edges formed at respective upper ends of said V-shaped groove of said base.

10. The device according to claim 6, further comprising a control unit to which electrical signals generated from said distancing-measuring sensors are inputted.

11. The device according to claim 1, further comprising a pair of rods which are in contact with a back surface of each said feeler and which move in directions perpendicular to said active surface, wherein the thrust means are resilient means which push the rods toward the feeler, and the sensor means are distance-measuring sensors which can measure a position of the rods with respect to the distance-measuring sensors.

12. The device according to claim 11, wherein the base includes holes in which the feelers are inserted movably and rotatably.

13. The device according to claim 12, wherein each feeler has a longitudinal slot, the base is provided with pins in the holes and each pin is inserted in the longitudinal slot.

14. The device according to claim 11, wherein the distance-measuring means are formed cylindrical in shape and receive the rods in such a way that the rods can move in directions toward and away from the feeler.

\* \* \* \* \*